(12) United States Patent
Akai et al.

(10) Patent No.: US 9,211,801 B2
(45) Date of Patent: Dec. 15, 2015

(54) CHARGING CABLE FOR ELECTRICALLY-DRIVEN VEHICLE

(75) Inventors: Naruaki Akai, Kyoto (JP); Norio Abe, Shiga (JP); Tomoyuki Kawase, Shiga (JP); Takashi Sawa, Shiga (JP); Masanori Nishikawa, Shiga (JP); Takaaki Hyoudou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 14/001,822

(22) PCT Filed: Mar. 2, 2012

(86) PCT No.: PCT/JP2012/001465
§ 371 (c)(1),
(2), (4) Date: Aug. 27, 2013

(87) PCT Pub. No.: WO2012/117743
PCT Pub. Date: Sep. 7, 2012

(65) Prior Publication Data
US 2013/0335024 A1   Dec. 19, 2013

(30) Foreign Application Priority Data

Mar. 3, 2011 (JP) ................... 2011-046392
Jan. 27, 2012 (JP) ................... 2012-015184

(51) Int. Cl.
*H02J 7/00* (2006.01)
*B60L 11/18* (2006.01)
*H01M 10/44* (2006.01)

(52) U.S. Cl.
CPC ........... *B60L 11/185* (2013.01); *B60L 11/1816* (2013.01); *H01M 10/44* (2013.01);
(Continued)

(58) Field of Classification Search
CPC ... Y02T 10/7005; Y02T 90/14; Y02T 90/121; Y02T 10/6269; Y02T 10/7077; Y02T 10/7044; Y02T 90/128; B60L 11/1818; B60L 2230/12; H02J 7/047
USPC ......................................... 320/109
See application file for complete search history.

(56) References Cited

U.S. PATENT DOCUMENTS

2010/0213896 A1    8/2010  Ishii et al.
2010/0228413 A1*   9/2010  Fujitake ...................... 701/22
(Continued)

FOREIGN PATENT DOCUMENTS

CN   101801711   8/2010
CN   101803142   8/2010
(Continued)

OTHER PUBLICATIONS

Chinese Office Action, Apr. 23, 2015; Chinese Patent Application No. 201280011388.4, with English translation of its Search Report (13 pages).

*Primary Examiner* — Vuthe Siek
(74) *Attorney, Agent, or Firm* — Hamre, Schumann, Mueller & Larson, P.C.

(57) ABSTRACT

A charging cable for use in charging a battery of an electrically-driven vehicle includes a power plug to be detachably connected to a receptacle outlet of a commercially available power source, a charging coupler to be detachably connected to the electrically-driven vehicle, a temperature sensor for detecting a temperature of an electric circuit between the power plug and the charging coupler, and a charging device having a controller for controlling a current value that flows from the power plug to the charging coupler. This configuration can minimize the charging time and enhance the durability between the charging cable and the receptacle outlet and between the charging cable and the charging coupler.

10 Claims, 8 Drawing Sheets

(52) U.S. Cl.
CPC .......... *B60L2230/12* (2013.01); *B60L 2240/36* (2013.01); *H01M 2220/20* (2013.01); *Y02T 10/7005* (2013.01); *Y02T 10/7088* (2013.01); *Y02T 90/121* (2013.01); *Y02T 90/14* (2013.01)

(56) References Cited

U.S. PATENT DOCUMENTS

2011/0204849 A1　　8/2011　Mukai et al.
2012/0249066 A1*　10/2012　Ichikawa .................. 320/109

FOREIGN PATENT DOCUMENTS

| CN | 102111001 | 6/2011 |
|---|---|---|
| JP | 7-67245 | 3/1995 |
| JP | 11-205909 A | 7/1999 |
| JP | 2006-74935 A | 3/2006 |
| JP | 2008-154305 | 7/2008 |
| JP | 2008-252986 | 10/2008 |
| JP | 2010-110050 | 5/2010 |
| JP | 2010-110055 | 5/2010 |
| JP | 2011-4448 A | 1/2011 |
| JP | 2011-15581 A | 1/2011 |
| JP | 2011-139572 | 7/2011 |
| WO | WO 2009/035069 | 3/2009 |
| WO | WO 2010/049773 | 5/2010 |
| WO | WO 2010/049775 | 5/2010 |
| WO | WO 2011/064856 | 6/2011 |

* cited by examiner

CHARGING CABLE FOR ELECTRICALLY-DRIVEN VEHICLE

TECHNICAL FIELD

The present invention relates to a charging cable for an electrically-driven vehicle for use in charging a battery of an electrically-driven vehicle such as, for example, an electric vehicle or a hybrid vehicle.

BACKGROUND ART

In recent years, electrically-driven vehicles are being developed as environmentally-friendly automobiles at a rapid pace. Charging infrastructures for the electrically-driven vehicles are largely classified into a charging facility for home use that utilizes a household power source at the end of a power network and another charging facility for public use that is available to the general public and provided in an urban area, beneath a road surface or the like.

Also, in view of convenience, the charging facility for home use is required for the popularization of the electrically-driven vehicles and, hence, standard homes, offices and the like have started introducing a slow charging facility that utilizes a commercially available 100V- or 200V-power source.

In the case of the charging facility for home use, a charging cable for an electrically-driven vehicle for connecting a receptacle outlet of the commercially available power source and a connector of the electrically-driven vehicle is used to charge a battery of the electrically-driven vehicle.

This charging cable is provided with a power plug to be connected to the receptacle outlet of the commercially available power source and a charging coupler to be connected to the connector of the electrically-driven vehicle. When the battery is charged, the power plug is inserted into a receptacle outlet provided on, for example, an outer wall of a house.

However, this charging cable has the potential for causing abnormal heat generation due to incomplete connection or arc tracking between the receptacle outlet and the power plug. Because of this, a charging cable having a temperature sensor for detecting the temperature of the power plug has been proposed, wherein if the temperature sensor detects that the temperature of the power plug has exceeded a predetermined temperature, a control signal is sent to a switching circuit for opening and closing an electric circuit between the power plug and the charging coupler so that power supply from the power plug to the connector of the electrically-driven vehicle may be halted (see, for example, Patent Document 1).

In the case of this charging cable, an earth leakage detecting portion for detecting an earth leakage is provided in addition to the temperature sensor for detecting the temperature of the power plug, and if the earth leakage detecting portion detects an earth leakage, power supply from the power plug to the connector of the electrically-driven vehicle is halted.

Patent Document 1: JP 2010-110055 A

SUMMARY OF INVENTION

Problems to Be Solved by the Invention

However, the charging cable as disclosed in Patent Document 1 halts power supply from the power plug to the connector of the electrically-driven vehicle if the temperature sensor detects that the temperature of the power plug or the charging coupler has exceeded the predetermined temperature or the earth leakage detecting portion detects the earth leakage. Accordingly, if lengthy energization is required as with the electrically-driven vehicle, the charging cable is problematic in that the charging time is prolonged or in durability of, for example, relays due to on/off controls.

The present invention has been developed in view of the problems inherent in the conventional art and is intended to provide a charging cable for an electrically-driven vehicle capable of minimizing the charging time and enhancing the durability of, for example, relays.

Means to Solve the Problems

In accomplishing the above objective, the present invention is directed to a charging cable for an electrically-driven vehicle for use in charging a battery of the electrically-driven vehicle, which charging cable includes a power plug to be detachably connected to a receptacle outlet of a commercially available power source, a charging coupler to be detachably connected to the electrically-driven vehicle, a temperature detector for detecting, when the battery of the electrically-driven vehicle is charged from the receptacle outlet, a temperature of an electric circuit between the power plug and the charging coupler, and a controller for generating a pilot signal indicating a charging current to the battery based on the temperature detected by the temperature detector to send the pilot signal to the electrically-driven vehicle.

Effects of the Invention

In the electrically-driven vehicle, the charging current to the built-in battery is controlled based on the pilot signal sent from the controller. According to the present invention, because the charging current to the electrically-driven vehicle is variably set depending on the temperature of the power plug, the controller or the charging coupler of the charging cable, the charging of the battery can be continued with a reduced charging current when the temperature of, for example, the power plug, the controller or the charging coupler increases. This feature can reduce the charging time and enhance the durability of, for example, relays, as compared with the conventional on/off control.

Also, because a first temperature detector is provided in the power plug and/or the charging coupler and a second temperature detector is provided in the controller, the controller can easily determine failures such as disconnection of the temperature detector provided in the power plug or the charging coupler by comparing outputs from the two temperature detector with each other, thereby making it possible to enhance the reliability of the equipment.

BRIEF DESCRIPTION OF DRAWINGS

The above aspects and features of the present invention will become apparent from the following description of preferred embodiments thereof with reference to the accompanying drawings, in which.

EMBODIMENT(S) FOR CARRYING OUT THE INVENTION

The present invention is directed to a charging cable for an electrically-driven vehicle for use in charging a battery of the electrically-driven vehicle, which charging cable includes a power plug to be detachably connected to a receptacle outlet of a commercially available power source, a charging coupler to be detachably connected to the electrically-driven vehicle, a temperature detector for detecting, when the battery of the electrically-driven vehicle is charged from the receptacle outlet, a temperature of an electric circuit between the power plug and the charging coupler, and a controller for generating a pilot signal indicating a charging current to the battery based on the temperature detected by the temperature detector to send the pilot signal to the electrically-driven vehicle.

Abnormal heat generation occurs due to incomplete connection or arc tracking at a connecting portion between the receptacle outlet and the power plug, a connecting portion between the charging coupler and a connector of the electrically-driven vehicle, connecting portions between feeder cables and terminals in the controller, or the like. Accordingly, the temperature detector is provided in the vicinity of each of such connecting portions in an electric circuit in which abnormal heat generation may occur.

As is well known, in the electrically-driven vehicle, the charging current to the built-in battery is controlled based on the pilot signal sent from the controller. According to this configuration, when the temperature detector detects abnormal heat generation, the charging current can be variably set on the side of the electrically-driven vehicle depending on the temperature detected by the temperature detector. Accordingly, for example, if the temperature of the power plug becomes high, the charging current is reduced to continue the charging of the battery while restraining a temperature increase of the power plug, thereby making it possible to reduce the charging time and, at the same time, enhance the durability of, for example, relays.

Also, a first temperature detector is provided in the power plug and/or the charging coupler and a second temperature detector is provided in the controller. By doing so, the controller can determine failures of the temperature detector provided in the power plug or the charging coupler based on outputs from the two temperature detector, thus leading to the reliability of the equipment.

More specifically, when the temperature detected by the temperature detector reaches a predetermined threshold value, the controller sends a pilot signal that has been changed in waveform to the electrically-driven vehicle to notify the electrically-driven vehicle to reduce the charging current, thereby making it possible to prevent overheating of the power plug and enhance the safety.

Also, when the temperature detected by the temperature detector reaches the predetermined threshold value, the controller sends a pilot signal that has been changed in pulse width to the electrically-driven vehicle to notify the electrically-driven vehicle to reduce the charging current. In this case also, similar effects can be obtained.

The controller may notify the electrically-driven vehicle to reduce the charging current in a stepwise fashion using the pilot signal.

Further, when the temperature detected by the temperature detector reaches the predetermined threshold value, the controller may send a pilot signal that has been changed in amplitude to the electrically-driven vehicle to notify the electrically-driven vehicle to reduce the charging current.

In addition, the controller may operate the temperature detected by the temperature detector to send a pilot signal that has been gradually changed in amplitude beforehand to the electrically-driven vehicle to notify the electrically-driven vehicle to reduce the charging current so that the threshold value may not be reached.

Further, in addition to each control method referred to above, the electric circuit may be finally blocked.

Embodiments of the present invention are described hereinafter with reference to the drawings, but the present invention is not limited by the embodiments.

Embodiment 1

Figure 1:
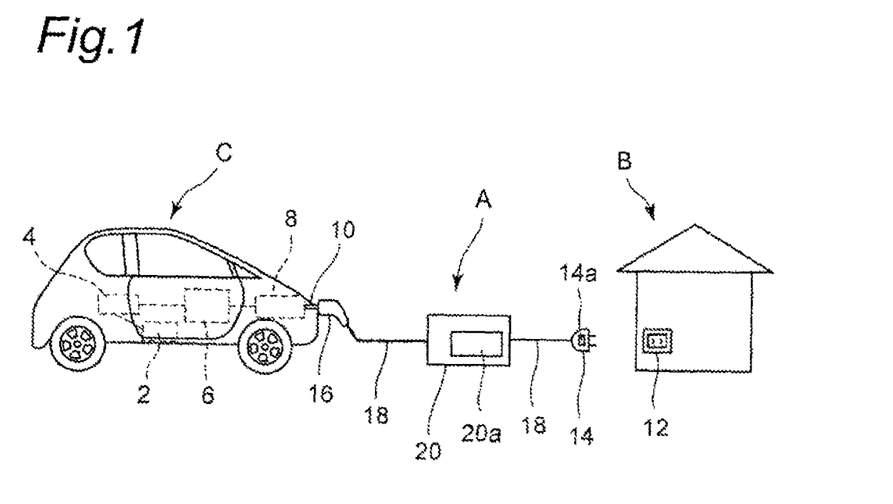
FIG. 1 is a schematic view depicting a state where a battery of an electrically-driven vehicle is electrically charged from a commercially available power source of a standard home using a charging cable for an electrically-driven vehicle according to a first embodiment of the present invention.

FIG. 1 depicts a state where a battery of an electrically-driven vehicle C is electrically charged from a commercially available power source of a standard home B using a charging cable A for an electrically-driven vehicle according to the present invention.

As shown in FIG. 1, the electrically-driven vehicle C is provided with a drive motor 2, an inverter 4, a battery 6 and a charge control device 8, all electrically connected to one another. The electrically-driven vehicle C is connected to the charging cable A for the electrically-driven vehicle (hereinafter referred to simply as the "charging cable") via a connector 10 connected to the charge control device 8. The charging cable A is used to connect a receptacle outlet 12 provided on, for example, an outer wall of the standard home B to the connector 10 on the side of the electrically-driven vehicle C to charge the battery 6 installed in the electrically-driven vehicle C.

The receptacle outlet 12 is an outlet or socket having a waterproof structure to prevent a short circuit of electrodes due to, for example, rainwater. The receptacle outlet 12 is connected to a commercially available power source (not shown) for supplying a single-phase two-wire alternating-current 100V.

On the other hand, the charging cable A is provided with a power plug 14 to be detachably connected to the receptacle outlet 12, a charging coupler 16 to be connected to the connector 10 of the electrically-driven vehicle C to supply electric power, a connecting cable 18 for connecting the power plug 14 and the charging coupler 16, and a charging device 20 located midway in the connecting cable 18 and having a controller (for example, microcomputer) 20a.

The power plug 14 has a temperature sensor (for example, resistance temperature detector) 14a embedded therein as a temperature detector for detecting the temperature of the power plug 14. A temperature signal outputted from the temperature sensor 14a is inputted to the controller 20a of the charging device 20.

The charging device 20 is further provided with a switching circuit (for example, a relay or relays not shown) for opening and closing an electric circuit between the power plug 14 and the charging coupler 16 and an earth leakage detecting portion (not shown) for monitoring an electric current flowing through the electric circuit to detect an earth leakage. If the earth leakage detecting portion detects the earth leakage, the controller 20a blocks the electric circuit via the switching circuit to halt power supply from the commercially available power source to the electrically-driven vehicle C.

In the charging system for the electrically-driven vehicle of the above-described construction, when the power plug 14 is connected to the receptacle outlet 12, electric power from the commercially available power source is supplied to the charging device 20 of the charging cable A. Because the switching circuit is initially in an on-state, the electric power from the commercially available power source is supplied to the charging coupler 16. As such, when the charging coupler 16 is connected to the connector 10 of the electrically-driven vehicle C, the battery 6 is electrically charged via the charge control device 8.

A charge control forming a core of the present invention is explained hereinafter with reference to FIGS. 2 and 3.

Figure 2:
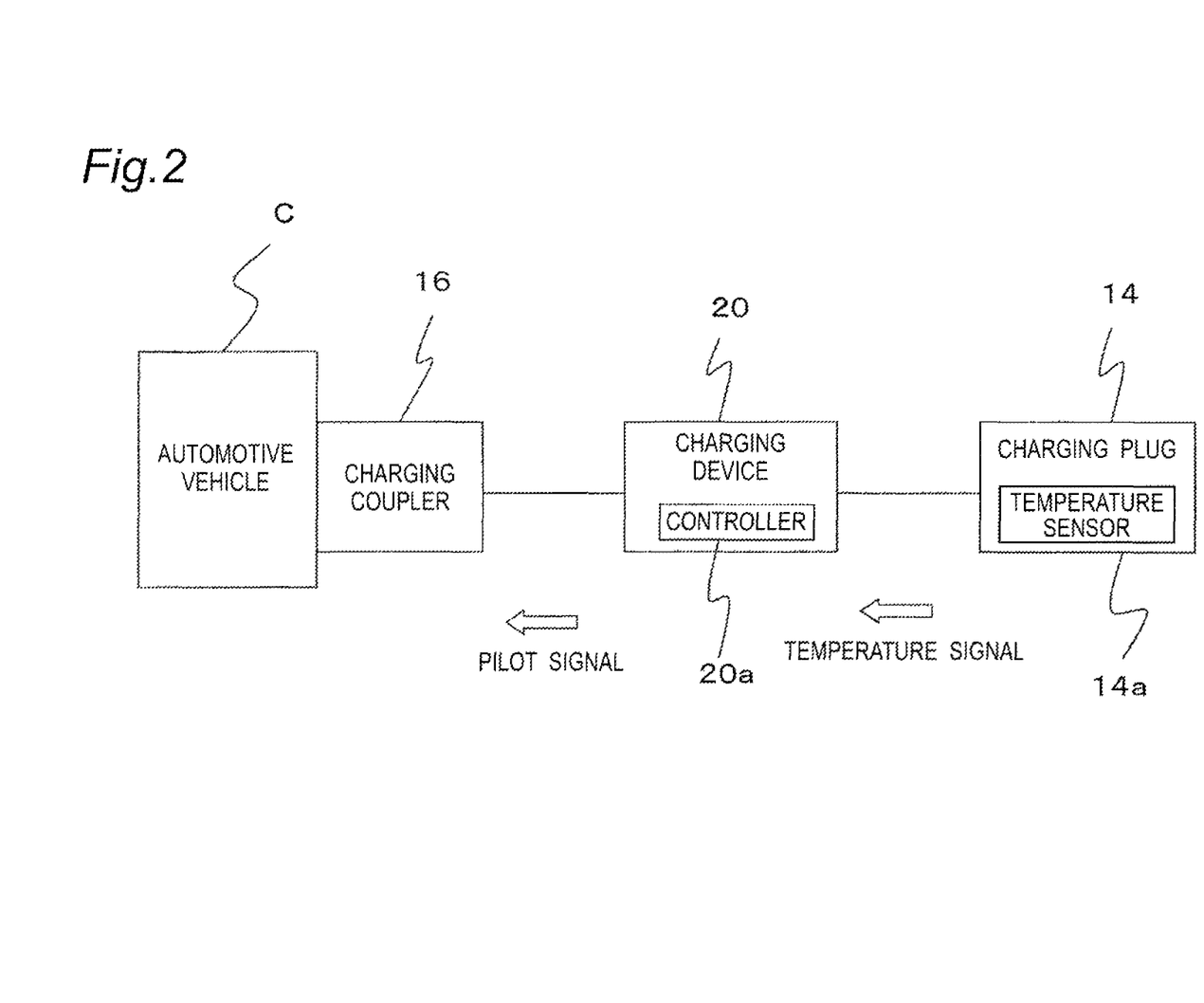
FIG. 2 is a schematic block diagram of the charging cable shown in FIG. 1.
Figure 3:
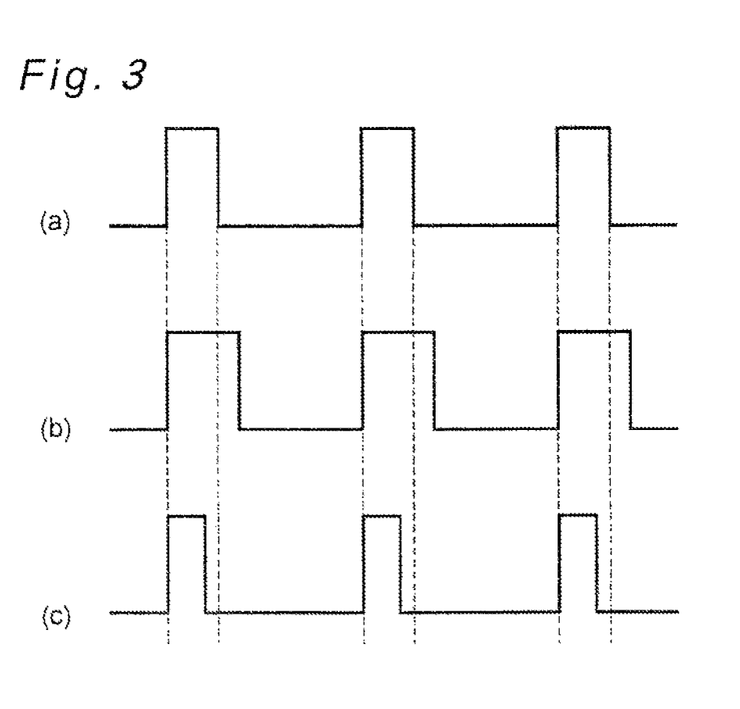
FIG. 3 depicts waveform diagrams of pilot signals outputted from a charging device shown in FIG. 2, which pilot signals are changed depending on the temperature of a power plug.

FIG. 2 is a schematic block diagram of the charging cable A and FIG. 3 depicts waveform diagrams of pilot signals outputted from the charging device 20 to the charging coupler 16.

As shown in FIG. 2, the temperature sensor 14a embedded in the power plug 14 detects the temperature of the power plug 14 and outputs a temperature signal indicating the temperature of the power plug 14 to the controller 20a provided in the charging device 20. Upon receipt of the temperature signal, the controller 20a outputs a pilot signal corresponding to the temperature signal to the charge control device 8 of the electrically-driven vehicle C via the charging coupler 16.

As described later, the pilot signal outputted from the controller 20a has a close relationship with a charging current. Because of this, when the charge control device 8 of the electrically-driven vehicle C receives the pilot signal indicating the charging current, the charge control device 8 can recognize the charging current that can be supplied from the receptacle outlet 12 via the charging cable A and conducts charging while controlling a supply current to the battery 6 in response to the pilot signal. The electric power charged to the battery 6 is supplied to the drive motor 2 via the inverter 4, thus enabling the electrically-driven vehicle C to run.

FIG. 3 depicts waveforms of pilot signals outputted from the controller 20a to the electrically-driven vehicle C, (a) indicating a reference waveform, (b) indicating a waveform when the temperature of the power plug 14 is low, and (c) indicating a waveform when the temperature of the power plug 14 is high.

Such pilot signals are further explained in detail taking a case where a commercially available 100V-power source is used and the power plug 14 has a rated current of 15 A. When the commercially available power source is 100V and the rated current of the power plug 14 is 15 A, the charging current (energization current) is set to, for example, 12 A. The pilot signal indicating this charging current has the reference waveform shown in FIG. 3(a) and a duty ratio (D) thereof is set to 20% (pulse width: 20%, pulse interval: 80%).

That is, the duty ratio of the pilot signal indicates the charging current itself. If the duty ratio exceeds 20%, the charging current exceeds 12 A, and if the duty ratio becomes smaller than 20%, the charging current becomes smaller than 12 A.

The power plug 14 is normally made of plastic, and assuming that the heatproof temperature thereof is 65° C., the charging cable A according to the present invention has a threshold value (for example, 50° C.) set to be lower than the heatproof temperature. When the temperature of the power plug 14 is less than the threshold value, the duty ratio is increased (D>20%) to increase the charging current, as shown in FIG. 3(b). On the other hand, when the temperature of the power plug 14 exceeds the threshold value, the duty ratio is reduced (D<20%) to reduce the charging current, as shown in FIG. 3(c).

The duty ratio of the pilot signal and the charging current are compliant with SAE J1772 (SAE: Society of Automotive Engineers) and have, for example, the following relationship:
Duty ratio D=20%: 12 A, and
Duty ratio D=30%: 18 A.

Figure 4:
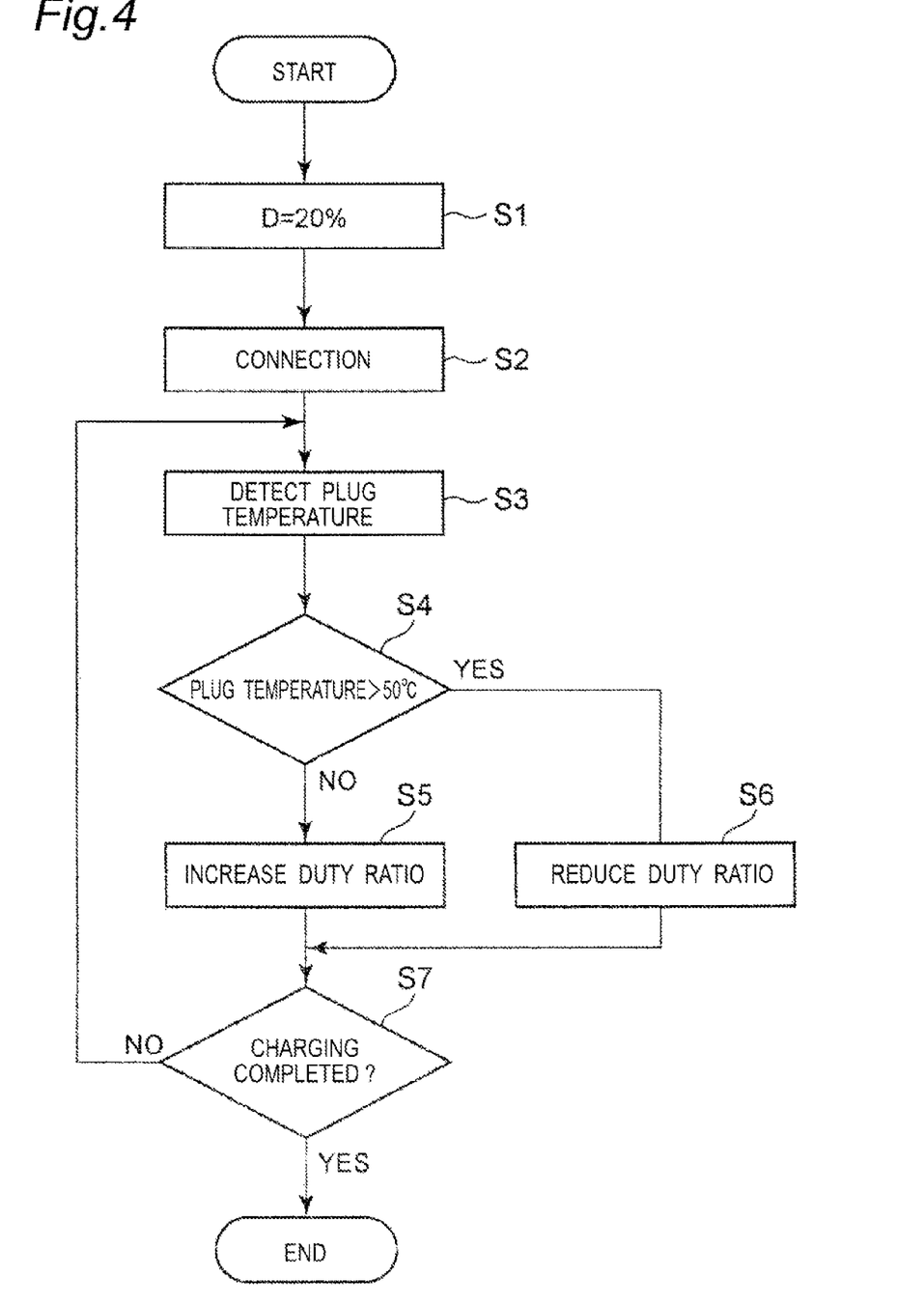
FIG. 4 is a flowchart indicating a charge control.

Further explanation is made with reference to a flowchart of FIG. 4 indicating a charge control. At step S1 before the charging cable A is connected to the electrically-driven vehicle C, the duty ratio of the pilot signal is set to D=20%. At step S2, the power plug 14 of the charging cable A is connected to the receptacle outlet 12 and the charging coupler 16 of the charging cable A is connected to the connector 10 of the electrically-driven vehicle C, followed by step S3, at which the temperature of the power plug 14 is detected by the temperature sensor 14a accommodated in the power plug 14 and a temperature signal from the temperature sensor 14a is inputted to the controller 20a of the charging device 20.

At step S4, the controller 20a compares the temperature inputted from the temperature sensor 14a with the threshold value referred to above.

Before the battery 6 of the electrically-driven vehicle C is charged from the receptacle outlet 12 via the charging cable A, the temperature of the power plug 14 is equal to an outdoor air temperature. When battery charging is initiated, the temperature of the power plug 14 increases gradually. At step S4, if the temperature detected by the temperature sensor 14a is less than the threshold value, the program advances to step S5, at which a control for steplessly increasing the duty ratio of the pilot signal is conducted to steplessly increase the charging current.

On the other hand, at step S4, if the temperature detected by the temperature sensor 14a exceeds the threshold value, the program advances to step S6, at which a control for steplessly reducing the duty ratio of the pilot signal is conducted to steplessly reduce the charging current.

As described above, the duty ratio of the pilot signal has a close relationship with the charging current and if the temperature of the power plug 14 is low, the charging current is increased. In contrast, if the temperature of the power plug 14 is high, the charging current is reduced. This eliminates the need for the charging current to be on/off controlled, unlike the conventional way, thus making it possible to achieve a balance between a reduction in charging time and the safety of the charging cable A.

After the charging current control has been conducted at step S5 or step S6, if the charge control device 8 of the electrically-driven vehicle C determines at step S7 that the battery 6 of the electrically-driven vehicle C has not been completely charged, the program returns to Step S3. On the other hand, if the charge control device 8 determines that the battery 6 of the electrically-driven vehicle C has been completely charged, the charge control device 8 of the electrically-driven vehicle C inputs a signal indicating completion of the charging to the controller 20a of the charging cable A, thereby terminating the charging of the battery 6.

It is to be noted here that the controller 20a sets a maximum value of the charging current (energization current) depending on the duty ratio (pulse width) of the pilot signal outputted to the electrically-driven vehicle C and that the charging current supplied to the battery 6 of the electrically-driven vehicle C is finally determined by the charge control device 8 of the electrically-driven vehicle C.

Although in the above embodiment the charging current has been described as being changed by changing the pulse width of the pilot signal outputted from the controller 20a, the charging current may be changed by changing a pulse waveform (for example, a pulse amplitude (level)) other than the pulse width.

Further, although in the above embodiment the charging current has been described as being steplessly increased or reduced by steplessly increasing or reducing the duty ratio of the pilot signal, the charging current may be increased or reduced in a stepwise fashion by increasing or reducing the duty ratio of the pilot signal in a stepwise fashion.

Also, although in the above embodiment the charging current is steplessly increased or reduced by steplessly increasing or reducing the duty ratio of the pilot signal, the charging current may be only reduced in a stepwise fashion by reducing the duty ratio of the pilot signal in a stepwise fashion.

In addition, although in the above embodiment the commercially available power source has been described as being 100V, any other alternating-current voltage (for example, alternating-current 200V) can be of course used.

A second threshold value greater than the aforementioned threshold value may be set in the controller 20a and, in this case, if the controller 20a detects a temperature greater than the second threshold value, the electric circuit is blocked.

Embodiment 2

Figure 5:
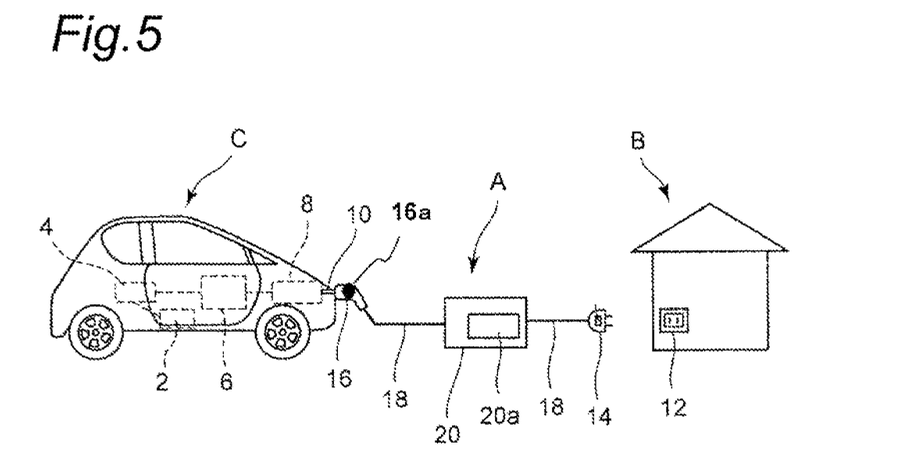
FIG. 5 is a schematic view depicting a state where the battery of the electrically-driven vehicle is electrically charged from the commercially available power source of the standard home using a charging cable for an electrically-driven vehicle according to a second embodiment of the present invention.
Figure 6:
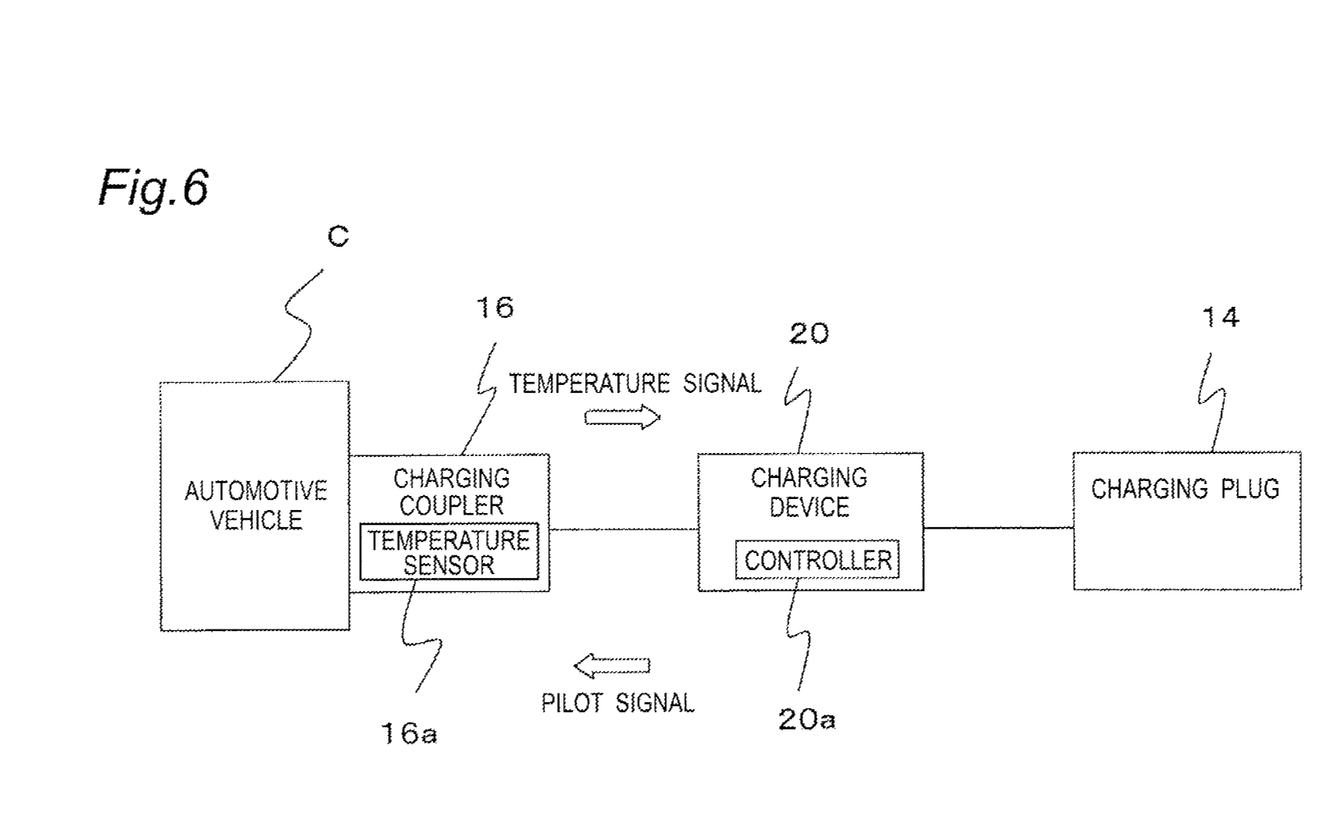
FIG. 6 is a schematic block diagram of the charging cable shown in FIG. 5.

FIGS. 5 and 6 depict a second embodiment of the present invention. FIG. 5 is a schematic view depicting a state where a battery of an electrically-driven vehicle is electrically charged using a charging cable according to the second embodiment of the present invention and FIG. 6 is a schematic block diagram of the charging cable shown in FIG. 5. In the second embodiment of the present invention, a temperature sensor 16a is provided in the charging coupler 16. The temperature sensor 16a detects the temperature of the charging coupler 16 and outputs a temperature signal indicating the temperature of the charging coupler 16 to the controller 20a of the charging device 20. Upon receipt of the temperature signal, the controller 20a outputs a pilot signal corresponding to the temperature signal to the charge control device 8 of the electrically-driven vehicle C via the charging coupler 16. The charge control device 8 can recognize, based on the pilot signal received, the charging current that can be supplied from the receptacle outlet 12 via the charging cable A and conducts charging while controlling a supply current to the battery 6 in response to the pilot signal.

This configuration can produce similar effects as in the first embodiment referred to above if abnormal heat generation occurs due to incomplete connection or arc tracking between the charging coupler 16 and the connector 10 of the electrically-driven vehicle C.

Embodiment 3

Figure 7:
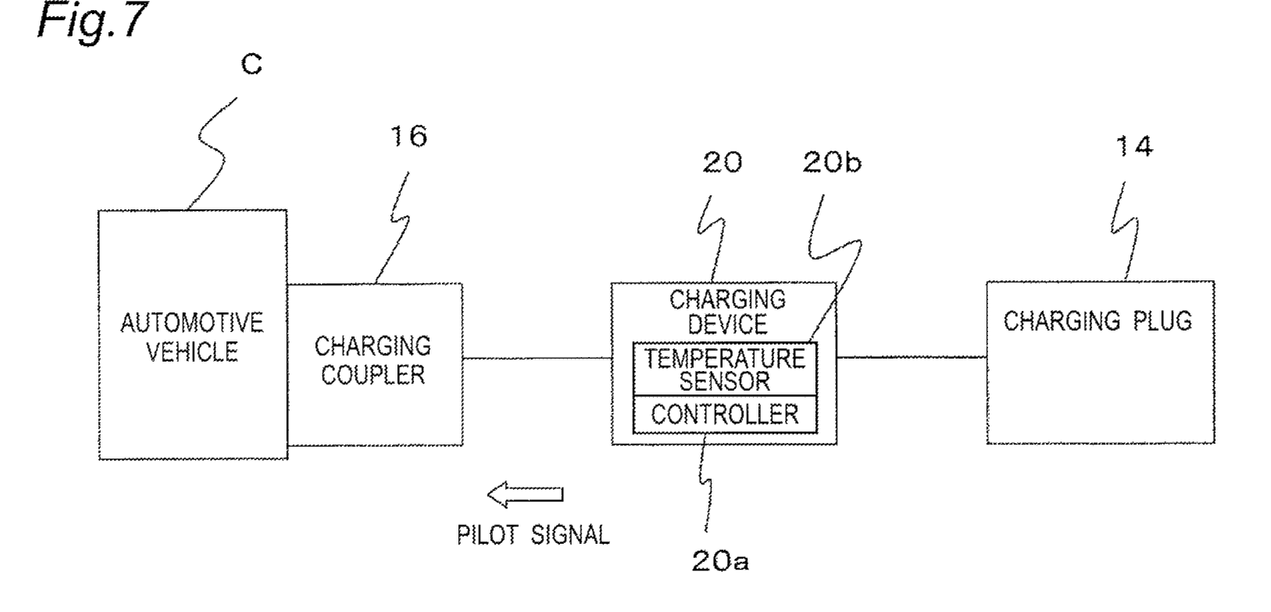
FIG. 7 is a schematic block diagram of a charging cable according to a third embodiment of the present invention.

FIG. 7 is a schematic block diagram of a charging cable according to a third embodiment of the present invention, in which a temperature sensor 20b is provided in the controller 20a of the charging device 20. It is assumed that the charging of the electrically-driven vehicle C is conducted under various circumstances and that the controller 20a abnormally generates heat, for example, with the charging device 20 left in the hot sun. It is also assumed that abnormal heat generation may occur due to incomplete connection or arc tracking at, for example, connecting portions between the connecting cable 18 of the controller 20a and terminals. In the third embodiment, the temperature sensor 20a provided in the controller 20 can prevent abnormal heat generation in the controller 20a, thus making it possible to produce similar effects as in the above-described first embodiment.

Embodiment 4

Figure 8:
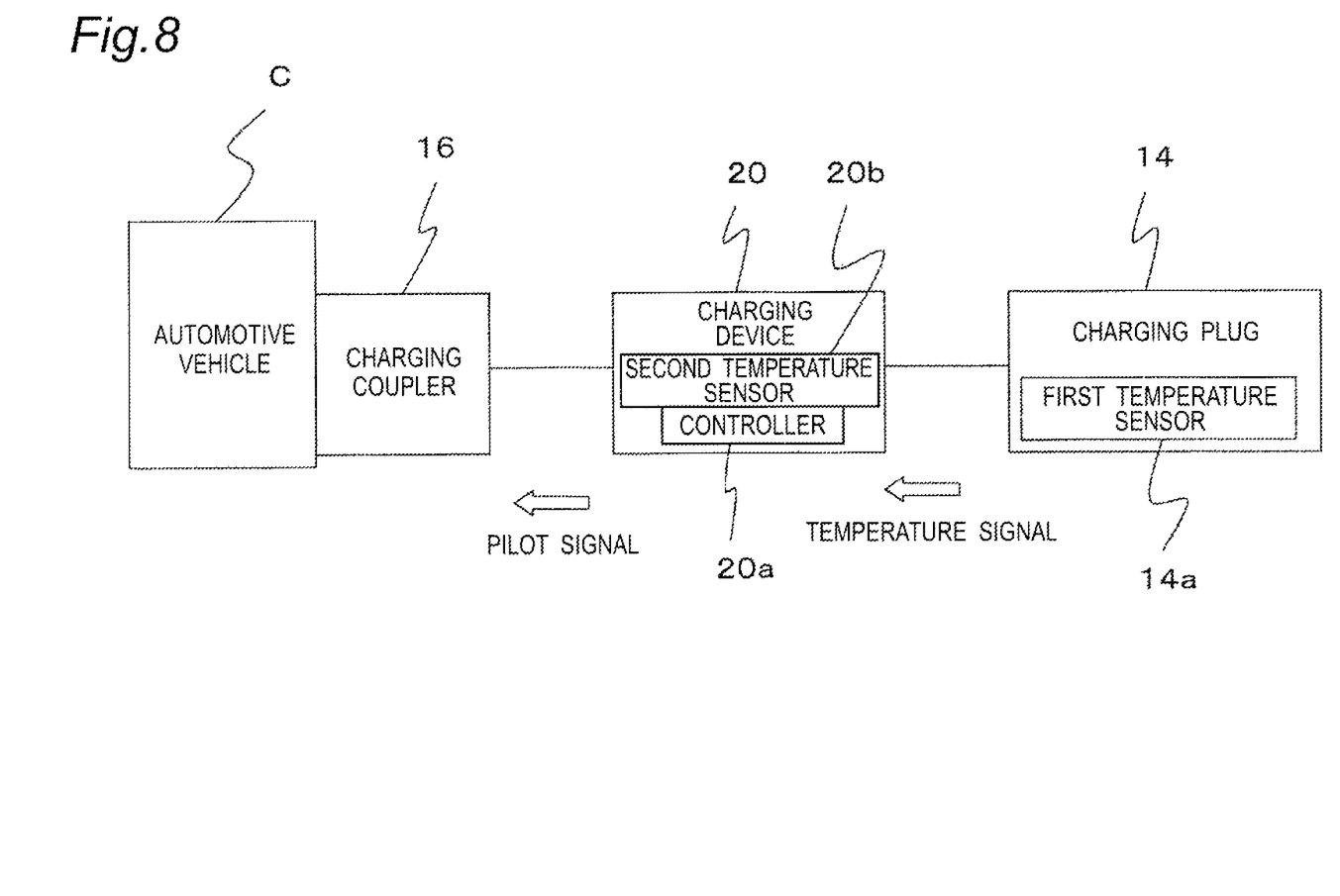
FIG. 8 is a schematic block diagram of a charging cable according to a fourth embodiment of the present invention.

FIG. 8 depicts a schematic block diagram of a charging cable according to a fourth embodiment of the present invention, in which a first temperature sensor 14a is provided in the power plug 14 and a second temperature sensor 20b is provided in the controller 20a. It is assumed that a user may handle the power plug 14 and the charging coupler 16 in a rough way. Because of this, if the temperature sensor 14a is provided in the power plug 14 or the charging coupler 16, it is conceivable that the temperature sensor deteriorates in durability. In the configuration according to the fourth embodiment, the controller 20a compares a value of the first temperature sensor 14a provided in the power plug 14 and that of the second temperature sensor 20b provided in the charging device 20 with each other to thereby easily detect disconnection of the temperature sensor 14a provided in the power plug 14.

If the second temperature sensor is provided in the charging coupler 16, similar effects can be obtained. Also, the charging plug 14, the charging coupler 16 and the charging device 20 may be provided with respective temperature sensors.

Any combination of the various embodiments referred to above can produce respective effects.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

Because the charging cable according to the present invention can reduce the charging time and enhance the durability of, for example, relays and the reliability of the equipment, it is effectively utilized as a cable for charging a drive battery of a vehicle that runs with at least the drive battery installed.

The contents of a specification, drawings and claims of a Japanese patent application No. 2011-046392 filed Mar. 3, 2011 and those of a specification, drawings and claims of a Japanese patent application No. 2012-015184 filed Jan. 27, 2012 are herein expressly incorporated by reference in their entirety.

EXPLANATION OF REFERENCE NUMERALS

A charging cable for an electrically-driven vehicle
B standard home
C electrically-driven vehicle
2 drive motor
4 inverter
6 battery
8 charge control device
10 connector
12 receptacle outlet
14 power plug
14a temperature sensor 16 charging coupler
16a temperature sensor
18 connecting cable
20 charging device
20a controller
20b temperature sensor

The invention claimed is:

1. A charging cable for use in charging a battery of an electrically-driven vehicle, the charging cable for the electrically-driven vehicle comprising:
   a power plug adapted to be detachably connected to a receptacle outlet of a commercially available power source;
   a charging coupler to be detachably connected to the electrically-driven vehicle;
   a temperature detector operable to detect, when the battery of the electrically-driven vehicle is charged, a temperature of an electric circuit between the receptacle outlet and the charging coupler; and
   a controller operable to generate a pilot signal indicating a charging current to the battery based on the temperature detected by the temperature detector to send the pilot signal to the electrically-driven vehicle,
   wherein the controller sends, when the temperature detected by the temperature detector reaches a predetermined threshold value, a pilot signal that has been changed in waveform to the electrically-driven vehicle to notify the electrically-driven vehicle to reduce the charging current.

2. The charging cable for the electrically-driven vehicle according to claim 1, wherein the temperature detector is provided in the power plug.

3. The charging cable for the electrically-driven vehicle according to claim 1, wherein the temperature detector is provided in the charging coupler.

4. The charging cable for the electrically-driven vehicle according to claim 1, wherein the temperature detector is provided in the controller.

5. The charging cable for the electrically-driven vehicle according to claim 1, wherein the temperature detector comprises a first temperature detector provided in the power plug and/or the charging coupler and a second temperature detector provided in the controller.

6. The charging cable for the electrically-driven vehicle according to claim 1, wherein the controller sends, when the temperature detected by the temperature detector reaches the predetermined threshold value, a pilot signal that has been changed in pulse width to the electrically-driven vehicle to notify the electrically-driven vehicle to reduce the charging current.

7. The charging cable for the electrically-driven vehicle according to claim 6, wherein the controller notifies the electrically-driven vehicle to reduce the charging current in a stepwise fashion using the pilot signal.

8. The charging cable for the electrically-driven vehicle according to claim 1, wherein the controller sends, when the temperature detected by the temperature detector reaches the predetermined threshold value, a pilot signal that has been changed in amplitude to the electrically-driven vehicle to notify the electrically-driven vehicle to reduce the charging current.

9. The charging cable for the electrically-driven vehicle according to claim 1, wherein the controller has a second threshold value greater than the predetermined threshold value to block the electric circuit when a temperature greater than the second threshold value is detected.

10. A charging cable for use in charging a battery of an electrically-driven vehicle, the charging cable for the electrically-driven vehicle comprising:
   a power plug adapted to be detachably connected to a receptacle outlet of a commercially available power source;
   a charging coupler to be detachably connected to the electrically-driven vehicle;
   a temperature detector operable to detect, when the battery of the electrically-driven vehicle is charged, a temperature of an electric circuit between the receptacle outlet and the charging coupler; and
   a controller operable to generate a pilot signal indicating a charging current to the battery based on the temperature detected by the temperature detector to send the pilot signal to the electrically-driven vehicle,
   wherein the charging cable comprises a switching circuit operable to open and close the electric circuit between the power plug and the charging coupler and an earth leakage detecting portion operable to monitor an electric current flowing through the electric circuit to detect an earth leakage, and when the earth leakage detecting portion detects the earth leakage, the controller blocks the electric circuit via the switching circuit.

* * * * *